United States Patent [19]

Zemanek, Jr.

[11] 4,071,815
[45] Jan. 31, 1978

[54] WELL LOGGING SYSTEM FOR MEASURING REMANENT MAGNETIC FIELDS IN THE EARTH

[75] Inventor: Joseph Zemanek, Jr., Dallas, Tex.

[73] Assignee: Mobil Oil Corporation, New York, N.Y.

[21] Appl. No.: 724,431

[22] Filed: Sept. 20, 1976

[51] Int. Cl.² .................... G01V 3/18; G01V 3/10; G01V 3/00
[52] U.S. Cl. ............................................ 324/8; 324/6
[58] Field of Search ........................................ 324/6, 8

[56] References Cited

U.S. PATENT DOCUMENTS

| | | | |
|---|---|---|---|
| 2,664,542 | 12/1953 | Lynn | 324/8 |
| 2,716,730 | 8/1955 | Williams | 324/8 |
| 3,263,161 | 7/1966 | Ruddock et al. | 324/8 |
| 3,274,488 | 9/1966 | Washkurak et al. | 324/8 X |
| 3,317,821 | 5/1967 | Patton et al. | 324/8 |
| 3,321,700 | 5/1967 | Zimmerman | 324/8 |
| 3,657,636 | 4/1972 | Dowling et al. | 324/6 |
| 3,882,375 | 5/1975 | Zemanek | 324/6 |
| 3,965,413 | 6/1976 | Yungul | 324/8 |

*Primary Examiner*—Gerard R. Strecker
*Attorney, Agent, or Firm*—C. A. Huggett; George W. Hager, Jr.

[57] ABSTRACT

A borehole tool for logging the remanent magnetic field of the earth formations surrounding a borehole includes a coil system having transmitter, receiver, and nulling coils; a phase-sensitive detector connected across the receiver and nulling coils to provide signals representative of magnetic susceptibility; and a detector system having a pair of axially spaced magnetometers, a pair of counters, an oscillator, a comparator, and a transmitter to provide signals representative of the total magnetic field differential between the two magnetometers. An uphole receiver compares differentials in the magnetic susceptibility measurements between two positions in the borehole with the total magnetic field differential between the same two positions as an indication of the earth's remanent magnetic field.

9 Claims, 2 Drawing Figures

WELL LOGGING SYSTEM FOR MEASURING REMANENT MAGNETIC FIELDS IN THE EARTH

BACKGROUND OF THE INVENTION

This invention relates to the logging of magnetic properties of formations traversed by a borehole and, more particularly, to the logging of properties related to the direction of the earth's magnetic field at the time of deposition of each of the individual formations rather than to the nature of the materials comprising the formations.

The total magnetic field of an earth formation includes, firstly, a component induced by the earth's present magnetic field and, secondly, a remanent magnetic field. This second component, a remanent magnetism, is related to the direction of the earth's magnetic field at the time of deposition of the sedimentary rocks of the formation. Consequently, reversals of this remanent magnetism between formations indicate paleomagnetic reversals in the direction of the earth's magnetic field between the times of deposition of the formations. A borehole logging tool for identifying such paleomagnetic reversals will be useful in delineating between the sedimentary rock deposits of the formation and in age dating such formation deposits.

SUMMARY OF THE INVENTION

A borehole logging system for measuring the earth's remanent magnetic field in subsurface formations traversed by the borehole includes a pair of spaced-apart detectors for simultaneously measuring the earth's total magnetic field at the two spaced-apart positions and a coil system for electromagnetically measuring the magnetic susceptibility of the subsurface formations surrounding the borehole at the two spaced-apart positions within the borehole. The differential between the total magnetic field measurements at the two spaced-apart positions is determined, as is the differential between the magnetic susceptibility measurements. The difference between these two differentials is a measurement of the remanent magnetism in the subsurface formation between the two spaced-apart positions.

By continuously recording the measurements of the earth's remanent magnetism as the two detectors and coil system are moved through the borehole, a log is produced in which changes in the polarity of the recorded remanent magnetism indicate paleomagnetic reversals in the surface formations.

DETAILED DESCRIPTION OF THE PREFERRED EMBODIMENT

Figure 1:
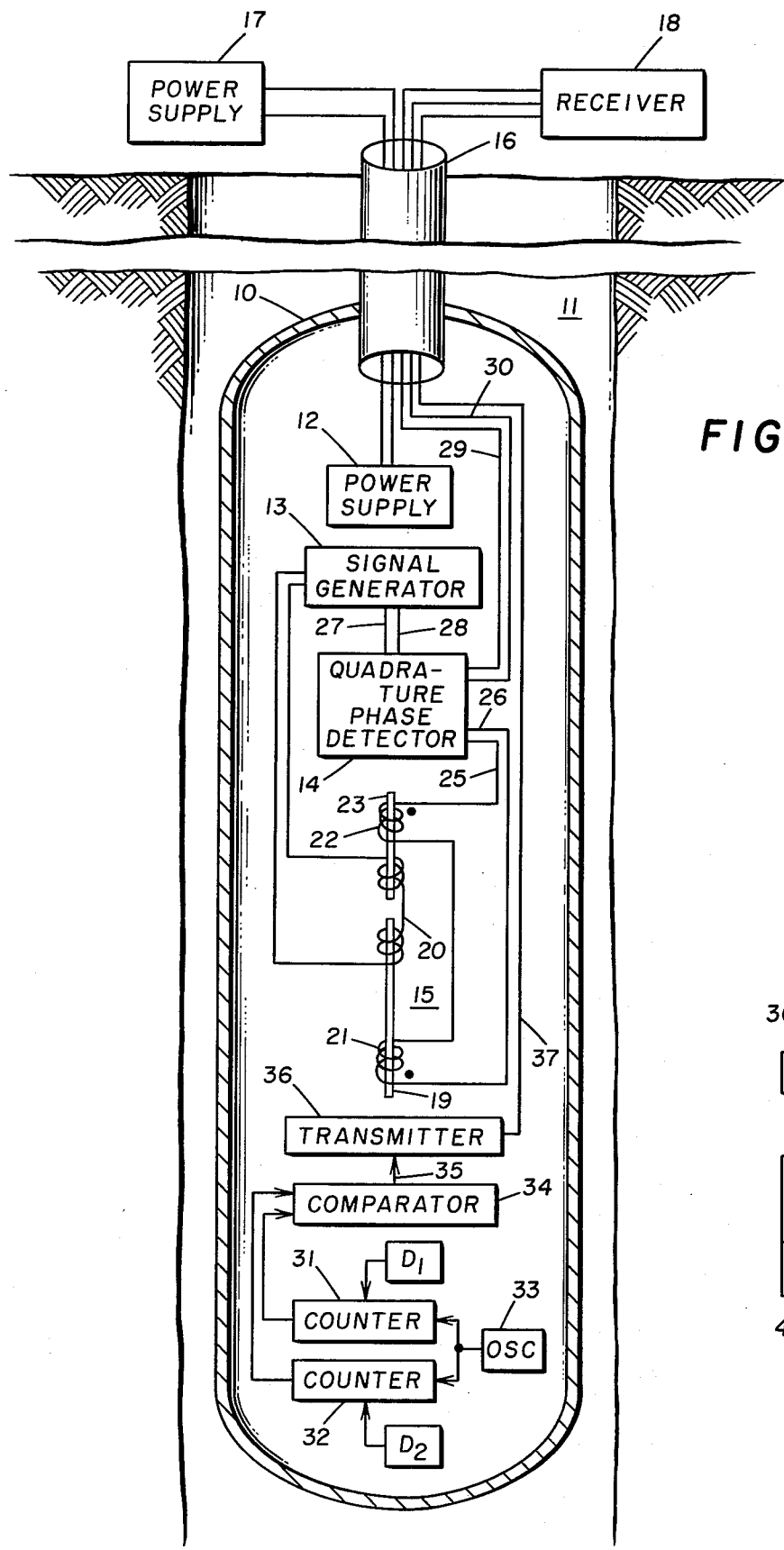
FIG. 1 is a diagrammatic representation of a logging tool in a borehole, including a schematic block diagram of circuit components.

Referring to FIG. 1, there is illustrated a borehole logging tool 10 employed along with an uphole power supply 17 and an uphole receiver 18 for identifying reversals in the paleomagnetic field of the earth formations surrounding the borehole. The earth's total magnetic field measured at a given point within the borehole is represented by the following expression:

$$M = H_e\mu_o(1+X)+\delta \tag{1}$$

wherein, $H_e$ = earth's present magnetizing field,
$\mu_o$ = formation permeability,
$X$ = formation magnetic susceptibility, and
$\delta$ = remanent magnetism.

The borehole logging tool 10 of the present invention is utilized to measure the total magnetic field, M, and the magnetic susceptibility, X, at two spaced-apart positions within the borehole and such measurements utilized by the uphole receiver 18 to determine changes in the remanent magnetism $\delta$ between such two spaced-apart positions in accordance with the following expression:

$$|M_1-M_2| = H_e\mu_o(X_1-X_2)+(\delta_1-\delta_2) \tag{2}$$

The remanent magnetism expressions $\delta_1$ and $\delta_2$ represent the earth's magnetic direction existing at the time the surface layering was laid down. These expressions are usually either in-phase or 180° out-of-phase.

The magnetic field measurements $M_1$ and $M_2$ are made by detectors $D_1$ and $D_2$, respectively, located at spaced-apart positions within the borehole tool. In a preferred embodiment, the detectors may be cesium- or rubidium-type vapor magnetometers spaced about two feet apart. The outputs of these detectors, in the range of 150 hertz, are applied to the counters 31 and 32. Also applied to the counters is a 10-megahertz clock signal from the oscillator 33. Each counter provides a binary coded decimal output in units, tens, and hundreds. The least significant of the digital outputs from the counters are subtracted in the comparator 34 to provide for a digital difference signal on line 35 in units, tens, and hundreds that is a representation of the magnetic field difference $|M_1-M_2|$ of the expression (2). Also provided is a ± sign signal. This digital difference signal and sign signal are applied to a transmitter 36 for transmission over line 37 to the uphole receiver 18.

Figure 2:
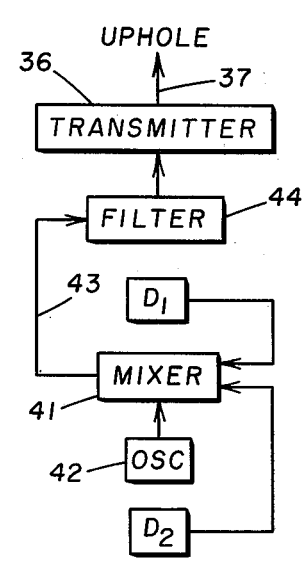

An alternative embodiment for the foregoing-described circuitry for producing a signal representative of the magnetic field difference $|M_1-M_2|$ is illustrated in FIG. 2. The outputs of detectors $D_1$ and $D_2$ are applied to a mixer 41 along with the output of a local oscillator 42. Mixer 31 beats the local oscillator signal with the received signals from the detectors $D_1$ and $D_2$ to provide both a sum and difference signal on output line 43. The sum portion of the signal, $f_1+f_2$, represents the sum of the frequencies of the $D_1$ and $D_2$ detector outputs and the difference portion of the signal, $f_1-f_2$, represents the difference between the frequencies of the $D_1$ and $D_2$ detector outputs. The high-frequency filter 44 is a conventional RC filter designed to pass only the $f_1-f_2$ portion of the signal from the mixer 41 as a direct representation of the magnetic field difference $|M_1-M_2|$ of the expression (2). This output of filter 44 representing the magnetic field difference $|M_1-M_2|$ is applied to the transmitter 36 by way of line 35 for transmission over line 37 to the uphole receiver 18.

The use of two detectors, $D_1$ and $D_2$, for simultaneously measuring the magnetic field at two spaced-apart positions within the borehole has a distinct advantage over the use of a single detector to measure the magnetic field at such two spaced-apart positions as the single detector traverses the borehole. The simultaneous magnetic field measurements at the two spaced-apart positions eliminate the time-variable effects of both the magnetotellurics within the formation and the sway and horizontal movement of the borehole tool as it traverses the borehole. The magnetotellurics effect is identical upon both detectors $D_1$ and $D_2$ at a given point in time as is the sway and horizontal movement effect. Therefore, the magnetic field difference measurement $|M_1 - M_2|$ as set forth in expression (2) is unaffected by these two time-varying effects.

The magnetic susceptibility measurements $X_1$ and $X_2$ are carried out by the signal generator 13, quadrature-phase detector 14, and the coil system 15. Briefly, a portion of transmitter coil 20 and a receiver coil 21 are wound about a magnetic core member 19; and the remaining portion of transmitter coil 20, along with a nulling coil 22, is wound about a magnetic core member 23. These two magnetic cores are coaxially mounted with respect to each other. The nulling coil 22 is connected in series opposition with the receiver coil 21 and is located close enough to the remaining portion of the transmitter coil 20 such that the total voltage induced across both the receiver and nulling coils when the transmitter coil is energized with alternating current is representative of the electrical conductivity and magnetic susceptibility of the adjacent earth formation. The phasesensitive detector 14 distinguishes between an in-phase component and a quadrature-phase component of the induced voltage, the in-phase component being in phase with the transmitter coil current and the quadrature component being 90° out of phase with the transmitter coil current. The detector provides an output representative solely of the quadrature component. The frequency of the laternating current through the transmitter coil is such that the quadrature component of the induced voltage across the receiver and nulling coils is affected to a greater extent by the magnetic susceptibility of the formation surrounding the borehole than by the formation conductivity. Therefore, as the borehole tool 10 traverses the borehole, the detector 14 sends to the uphole receiver 18 by way of lines 29 and 30 signals representative of the magnetic susceptibilities of the formations corresponding to the locations in the borehole at which the magnetic field measurements $M_1$ and $M_2$ are made by the detectors $D_1$ and $D_2$.

The uphole receiver 18 subtracts the magnetic field difference signal $|M_1 - M_2|$ from the difference of the magnetic susceptibility signals $(X_1 - X_2)$ in accordance with expression (2) to provide a continuous recording of the polarity of the remanent magnetism summation $(\delta_1 - \delta_2)$ as the borehole logging tool 10 traverses the formations surrounding the borehole. Changes in the recorded polarity identify the location of those formations in which reversals occurs in the paleomagnetic field.

I claim:
1. A method for determining paleomagnetic reversals between subsurface formations traversed by a borehole, comprising the steps of:
   a. measuring the differential in the earth's total magnetic field at two spaced-apart positions within the borehole,
   b. measuring the differential in the earth's magnetic susceptibility at each of said two spaced-apart positions within the borehole,
   c. subtracting said differentials to provide a measurement of the change in remanent magnetism between adjacent subsurface formations, and
   d. recording said change in remanent magnetism in correlation with depth to provide a record of the location of paleomagnetic reversals between subsurface formations.

2. A borehole logging system for detecting paleomagnetic reversals in subsurface formations traversed by a borehole, comprising:
   a. a first detector for measuring the earth's total magnetic field at a first location within the borehole,
   b. a second detector axially spaced from said first detector for measuring the earth's total magnetic field at a second location within the borehole simultaneously with the measurement carried out at said first location,
   c. electromagnetic means for measuring the magnetic susceptibility of the subsurface formations surrounding the borehole at said first and second locations,
   d. means for determining a first differential in the measurements of the earth's total magnetic field at said first and second locations,
   e. means for determining a second differential in the measurements of the magnetic susceptibilities at said first and second locations,
   f. means for subtracting said first and second differentials to detect changes in the earth's magnetic field in the subsurface formations between said first and second locations, and
   g. recording said changes in the earth's remanent magnetic field in correlation with depth, polarity changes indicating the locations of paleomagnetic reversals between subsurface formations.

3. The system of claim 2 wherein said first and second detectors are cesium vapor magnetometers.

4. The system of claim 2 wherein said first and second detectors are rubidium vapor magnetometers.

5. The system of claim 2 wherein said means for determining said first differential comprises:
   a. means for converting the outputs of said first and second detectors into first and second digital signals, respectively, and
   b. means for comparing said first and second digital signals to produce a signal representative of the differential between the magnetic field measurements of said first and second detectors.

6. The system of claim 5 wherein said means for converting the outputs of said first and second detectors into digital signals comprises first and second counters connected to said first and second detectors respectively to provide digital outputs representative of the frequencies of the magnetic field measurements made by said first and second detectors.

7. The system of claim 6 wherein said means for comparing said first and second digital signals comprises means for subtracting the digital outputs from said first and second counters to produce a signal representative of the differential between the frequencies of the magnetic field measurements of said first and second detectors.

8. The system of claim 2 wherein said means for determining said first differential comprises:
   a. an oscillator tuned to provide an output signal at a frequency different from that of the signals from said first and second detectors, and
   b. means for mixing the oscillator signal and the first and second detector signals to produce a signal representative of the differential between the frequencies of said first and second detector signals.

9. The system of claim 8 wherein said means for producing said mixed signal comprises:
   a. means for beating the oscillator signal with the first and second detector signals to provide sum and difference signals, and
   b. a filter that rejects said sum signals and passes said difference signals as a mixed signal representative of the differential between the frequencies of said first and second detector signals.

* * * * *

UNITED STATES PATENT AND TRADEMARK OFFICE
CERTIFICATE OF CORRECTION

PATENT NO. : 4,071,815
DATED : January 31, 1978
INVENTOR(S) : Joseph Zemanek, Jr.

It is certified that error appears in the above—identified patent and that said Letters Patent are hereby corrected as shown below:

On Title Page under "References Cited", the Class and Sub-Class for U.S. Pat. 3,274,488 should be --324/8 XR--.

Column 3, line 21, "phasesensitive" should be --phase-sensitive--.
line 28, "laternating" should be --alternating--.
Column 4, line 18, after "earth's" and before "magnetic" insert --remanent--.

Signed and Sealed this

Sixth Day of June 1978

[SEAL]

Attest:

RUTH C. MASON
Attesting Officer

DONALD W. BANNER
Commissioner of Patents and Trademarks